(12) United States Patent
Zeaiter

(10) Patent No.: US 8,920,761 B2
(45) Date of Patent: Dec. 30, 2014

(54) METHOD FOR PRODUCING HIGH PURITY SILICON

(75) Inventor: Khalil Zeaiter, Ottawa (CA)

(73) Assignee: Elkem Solar AS, Oslo (NO)

( * ) Notice: Subject to any disclaimer, the term of this patent is extended or adjusted under 35 U.S.C. 154(b) by 869 days.

(21) Appl. No.: 13/133,914

(22) PCT Filed: Sep. 9, 2010

(86) PCT No.: PCT/NO2010/000332
§ 371 (c)(1),
(2), (4) Date: Jun. 9, 2011

(87) PCT Pub. No.: WO2011/037473
PCT Pub. Date: Mar. 31, 2011

(65) Prior Publication Data
US 2011/0250118 A1    Oct. 13, 2011

(30) Foreign Application Priority Data

Sep. 23, 2009   (NO) .................................... 20093054

(51) Int. Cl.
*C01B 33/02* (2006.01)
*C01B 33/037* (2006.01)
*C01B 33/00* (2006.01)

(52) U.S. Cl.
CPC ............... *C01B 33/037* (2013.01); *C01B 33/02* (2013.01); *C01B 33/00* (2013.01); *C01P 2006/80* (2013.01)
USPC ........... 423/348; 423/350; 423/349; 423/342; 423/344; 423/345; 423/340; 423/335

(58) Field of Classification Search
CPC ...... C01B 33/00; C01B 33/02; C01B 33/037; C01B 33/039; C01P 2006/80
See application file for complete search history.

(56) References Cited

U.S. PATENT DOCUMENTS

| 2,885,364 | A | | 5/1959 | Swartz | |
| 4,241,037 | A | * | 12/1980 | Pelosini et al. | ................ 423/348 |
| 4,379,777 | A | | 4/1983 | Boulos | |
| 4,539,194 | A | | 9/1985 | Halvorsen | |
| 4,643,833 | A | | 2/1987 | Aulich et al. | |
| 4,828,814 | A | | 5/1989 | Sanjurjo et al. | |
| 5,648,042 | A | * | 7/1997 | Miller, Jr. | ........................ 266/44 |

FOREIGN PATENT DOCUMENTS

WO     01/42136    6/2001

* cited by examiner

*Primary Examiner* — Melvin C Mayes
*Assistant Examiner* — Smita Patel
(74) *Attorney, Agent, or Firm* — Lucas & Mercanti, LLP

(57) ABSTRACT

The present invention relates to a method for producing high purity silicon comprising providing molten silicon containing 1-10% by weight of calcium, casting the molten silicon, crushing the silicon and subjecting the crushed silicon to a first leaching step in an aqueous solution of HCl and/or HCl+ FeCl3 and to a second leaching step in an aqueous solution of HF and HNO3. The leached silicon particles is thereafter subjected to heat treatment at a temperature of between 1250° C. and 1420° C. for a period of at least 20 minutes and the heat treated silicon is subjected to a third leaching step in an aqueous solution of HF and HNO3.

5 Claims, No Drawings

METHOD FOR PRODUCING HIGH PURITY SILICON

This is a 371 of PCT/NO2010/000332 filed Sep. 9, 2010 which in turn claimed the priority of Norwegian Patent Application No. 2009/3054 filed Sep. 23, 2009, both applications are incorporated by reference herein.

TECHNICAL FIELD

The present invention relates to a method for production of high purity silicon.

BACKGROUND ART

From U.S. Pat. No. 4,539,194 it is known a method for production of pure silicon where one or more calcium compounds are added to molten metallurgical grade silicon in an amount sufficient to provide molten silicon containing about 1.0 to about 10.0% by weight calcium. The calcium alloyed silicon is cast and the solidified silicon is pre-crushed and than subjected to a leaching step by using an aqueous solution of $FeCl_3$ and HCl. This first leaching step causes disintegration at the silicon and where the resulting silicon grain after washing is subjected to a second leaching step with an aqueous solution of HF and $HNO_3$. When the molten silicon alloyed with calcium is solidified the main part of the calcium solidifies as a calcium-silicide phase along the grain boundaries of the silicon. This calcium-silicide phase also contains a majority of other impurity elements contained in the metallurgical grade silicon, particularly iron, aluminium, titanium, vanadium, chromium and others. The calcium-silicide phase containing these impurities dissolves during the leaching steps and the impurity elements contained in the calcium-silicide phase are thus removed from the silicon particles. Very good results are obtained by the method of U.S. Pat. No. 4,539,194. It has, however, been found that not all calcium-silicide phase appears on the grain boundaries of the solidified silicon. Some of the calcium-silicide phase is isolated within the grains of silicon and in narrow channels and are consequently not available to the acid solutions during the leaching steps of U.S. Pat. No. 4,539,194.

There is thus a need for a method to further refine the silicon purified by the method of U.S. Pat. No. 4,539,194.

DESCRIPTION OF THE INVENTION

The present invention thus relates to a method for producing high purity silicon comprising providing molten silicon containing 1-10% by weight of calcium, casting the molten silicon, crushing the silicon and subjecting the crushed silicon to a first leaching step in an aqueous solution of HCl and/or $HCl+FeCl_3$ and to a second leaching step in an aqueous solution of HF and $HNO_3$, said method being characterized in that the leached silicon particles is subjected to heat treatment at a temperature of between 1250° C. and 1420° C. for a period of at least 20 minutes and subjecting the heat treated silicon to a third leaching step in an aqueous solution of HF and $HNO_3$.

Preferably the heat treatment is carried out at a temperature of above 1300° C. and more preferably at a temperature of above 1400° C.

Preferably the silicon particles is washed with water after the third leaching step.

The heat treatment can be carried out either as a batch process or continuously. A continuous heat treatment can for instance be carried out in a tunnel furnace with a horizontal moving belt.

It has surprisingly been found that during the heat treatment remaining calcium-silicide phase and $FeSi_2$ phase containing impurity elements melts and migrate out to the surface of the silicon particles. In addition other silicide phases form during the heat treatment, such as $Cu_3Si$, $NiSi_2$, $CuFeSi$, $FeNiCuSi$ and others also migrate to the surface of the silicon particles. The phases that have migrated to the surface of the silicon particles are then dissolved in the third leaching step resulting in very pure silicon particles after the third leaching step. It is believed that at temperatures below the melting point of silicon the migration of the molten silicide phases to the surface of the silicon particles may be due to the fact that when solid silicon is heated to a high temperature the silicide phases melt and undergoes a volume expansion while the silicon undergoes a volume increase thus creating a force on the molten silicide phases squeezing the molten silicide phases out from the narrow channels to the outer surface of the silicon particles. Upon further cooling the molten silicide-phases solidifies on the surface at the silicon particles

DETAILED DESCRIPTION OF THE INVENTION

Example 1

Samples of silicon particles having been alloyed by calcium and leached according to the method of U.S. Pat. No. 4,539,194 were heat treated for about 60 minutes at temperatures of 1250° C., 1400° C. and 1420° C. respectively and thereafter leached in an aqueous solution of $HF+HNO_3$, and the resulting silicon particles where washed with water and dried.

Table 1, 2 and 3 show the elemental analysis before heat treatment and after the $HF+HNO_3$ leaching as well as the reduction in percentage of impurity elements obtained by the process

TABLE 1

Silicon particles heat treated at 1250° C. and leached with $HF + HNO_3$

| Impurity elements | Content in ppm in silicon before heat treatment | Content in ppm in silicon after leaching | Reduction in % |
|---|---|---|---|
| Al | 2.80 | 2.60 | 7 |
| Ca | 366.00 | 237 | 35 |
| Cr | 2.0 | 0.50 | >75 |
| Fe | 56.00 | 42.00 | 25 |
| Mn | 1.20 | 0.65 | 46 |
| Ni | 1.80 | 2.00 | ÷11 |
| Ti | 2.60 | 1.90 | 27 |
| V | 0.85 | 0.45 | 47 |
| P | 1.50 | 1.60 | ÷7 |

TABLE 2

Silicon particles heat treated at 1400° C. and leached with $HF + HNO_3$

| Impurity elements | Content in ppm before heat treatment | Content in ppm after leaching | Reduction in % |
|---|---|---|---|
| Al | 1.6 | 0.5 | 66 |
| Ca | 470 | 180 | 62 |
| Cr | 1.7 | 0.5 | >71 |
| Fe | 55 | 30.0 | 45 |
| Mn | 1.20 | 0.4 | 66 |
| Ni | 1.60 | 1.8 | ÷13 |
| Ti | 2.7 | 1.1 | 59 |
| V | 0.75 | 0.3 | 60 |
| P | 2 | 2.4 | ÷20 |

TABLE 3

Silicon particles heat treated at 1420° C. and leached with HF + $HNO_3$

| Impurity elements | Content in ppm before heat treatment | Content in ppm after leaching | Reduction in % |
|---|---|---|---|
| Al | 2.8 | 1.1 | 61 |
| Ca | 366 | 16 | 96 |
| Cr | 2.0 | 0.5 | >75 |
| Fe | 56.0 | 5.9 | 89 |
| Mn | 1.2 | 0.1 | 92 |
| Ni | 1.8 | 0.3 | 83 |
| Ti | 2.6 | 0.4 | 85 |
| V | 0.9 | 0.1 | 88 |
| P | 1.5 | 1.7 | ÷13 |

As can be seen from Tables 1, 2 and 3, a substantial reduction of the content of impurity elements from the silicon particles are obtained already when the heat treatment is carried out at 1250° C. and that the reduction of the content of impurity elements increases quite substantially with increasing temperature of the heat treatment. For heat treatment at 1420° C. a reduction level of the impurity elements is 80% or more. At this temperature the silicon is almost in molten state and the molten silicide-phases segregate to the surface of the silicon particles. The intro-grain channels are reformed as new polycrystalline structure is being formed.

The invention claimed is:

1. A method for producing high purity silicon comprising:
providing molten silicon containing 1-10% by weight of calcium;
casting the molten silicon;
crushing the cast silicon to form silicon particles;
subjecting the silicon particles to a first leaching step in an aqueous solution of HCl and/or HCl+$FeCl_3$;
subjecting the first leached silicon particles to a second leaching step in an aqueous solution of HF and $HNO_3$;
subjecting the second leached silicon particles to heat treatment at a temperature of between 1250° C. and 1420° C. for a period of at least 20 minutes, wherein the second leached silicon particles are in particulate form during the heat treatment; and
subjecting the heat treated silicon particles to a third leaching step in an aqueous solution of HF and $HNO_3$.

2. The method according to claim 1, wherein the heat treatment is carried out at a temperature of above 1300° C.

3. The method according to claim 1, wherein the heat treatment is carried out in a tunnel furnace with a horizontal moving belt.

4. The method according to claim 1, wherein the silicon particles are washed with water after the third leaching step.

5. The method according to claim 1, wherein the heat treatment is carried out at a temperature of above 1400° C.

* * * * *